March 12, 1946.   G. A. CHADWICK ET AL   2,396,247
GUN SLIDE TRUNNION BEARING
Filed Sept. 11, 1942   2 Sheets-Sheet 2
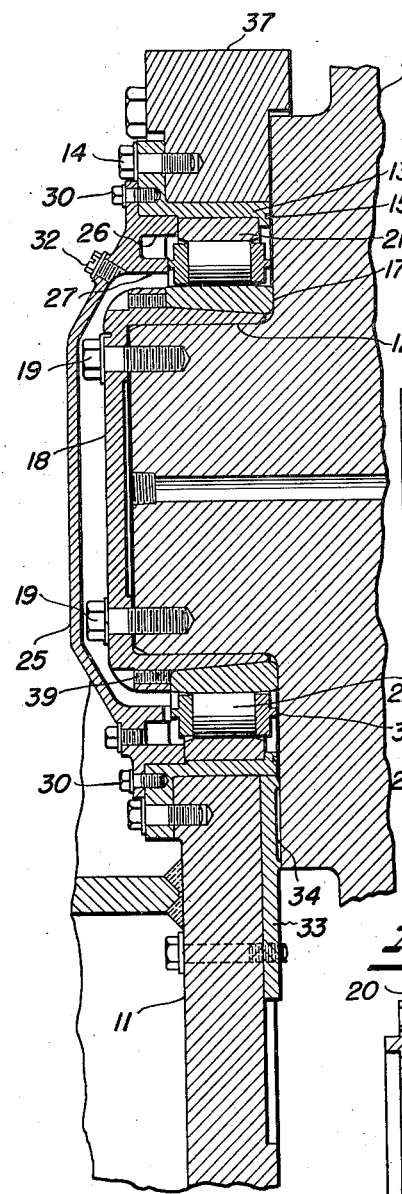
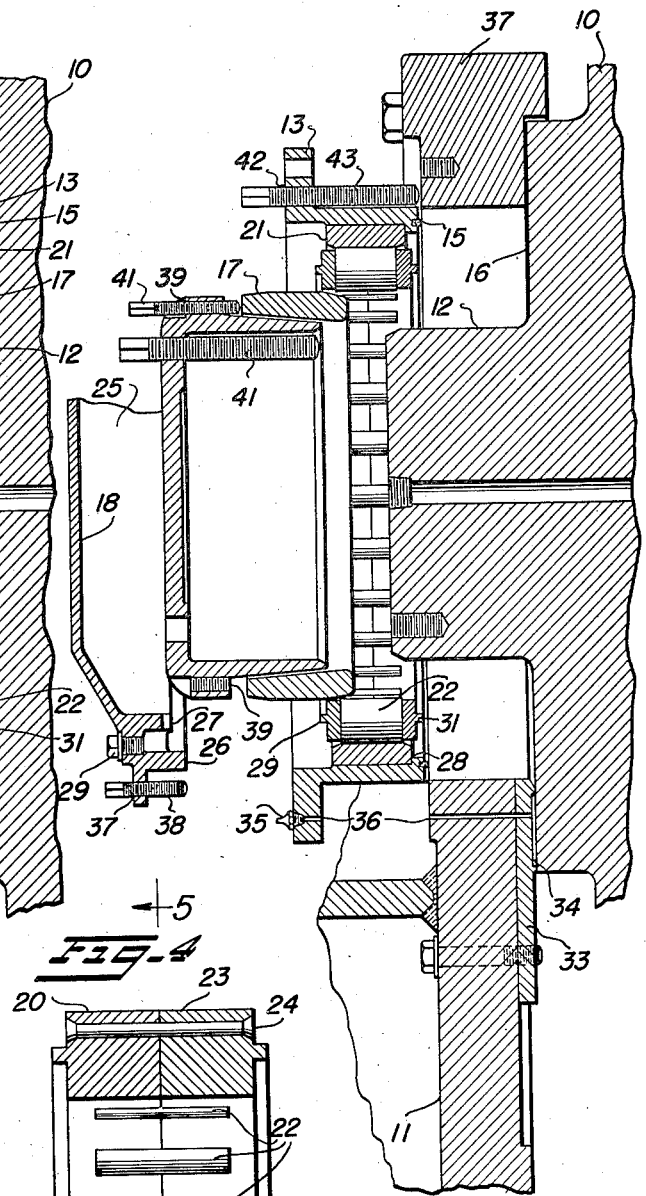
INVENTORS
GEORGE A. CHADWICK
PHILIAS H. GIROUARD
BY
ATTORNEY Patented Mar. 12, 1946

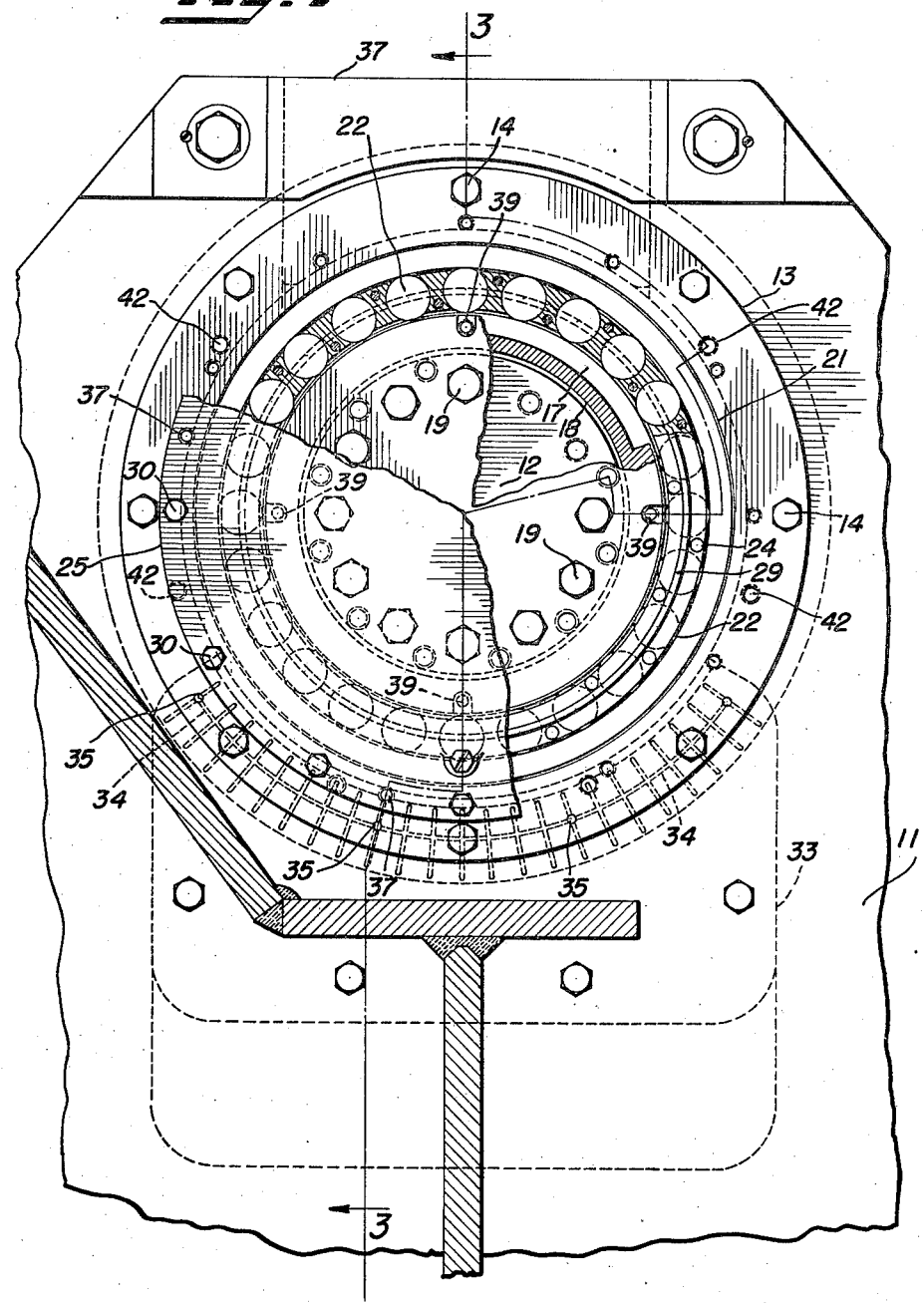

2,396,247

UNITED STATES PATENT OFFICE 2,396,247

GUN SLIDE TRUNNION BEARING

George A. Chadwick, Washington Grove, Md., and Philias H. Girouard, Washington, D. C.

Application September 11, 1942, Serial No. 458,038

1 Claim. (Cl. 308—207)

(Granted under the act of March 3, 1883, as amended April 30, 1928; 370 O. G. 757)

This invention relates to anti-friction bearings for ordnance mounts. In particular it is intended to be used in connection with the mounting of naval rifles or other guns of especially heavy caliber such as are used in main batteries aboard ship and in shore batteries.

In previous constructions of trunnion bearings of turret guns on ships the trunnion was mounted directly in an ordinary bearing in the supporting member. Furthermore, the design of prior anti-friction bearings for trunnion bearings using roller anti-friction elements was such that it was impossible to remove, repair and reassemble such bearings without unshipping the entire gun and its mount.

Therefore, it is the object of this invention to provide a heavy gun bearing which may be disassembled and reassembled at the point of service without removal of the gun from its mounting.

It is another object of this invention to provide a bearing for heavy guns which may be repaired and new parts substituted for worn parts while the gun is in place.

A further object is to provide a bearing for heavy gun mounts which will be more efficient and practical in operation.

Still further objects, advantages and improvements will be apparent from the following description of the invention taken in connection with the accompanying drawings, of which:

Fig. 1 is a side view, partly cut away, showing the trunnion and bearing in place in its supporting deck lug.

Fig. 2 is an elevational view in section taken in the vertical plane which bisects the axis of the trunnion.

Fig. 3 is an exploded view in section along the broken line 3—3 of Fig. 1.

Fig. 4 is a cross-sectional view of the roller cage.

Fig. 5 is a view of the roller cage partly in section taken along the line 5—5 in Fig. 4.

Referring now to the drawings in which like numerals indicate like parts throughout the several views, 11 is a deck lug or other suitable supporting means, which is in turn mounted upon the gun girders in the turret in the usual manner. The gun trunnion, which is supported by the deck lug on the bearing which is the object of the present invention, is shown at 12.

An outer bearing seat 13 of substantially cylindrical construction is fitted within a suitable opening provided in the deck lug 11 and attached by studs or bolts 14. A washer, or grease retainer 15, of wool felt or other suitable material, is held in a groove on the inner face of the outer bearing seat 13. This washer bears against the vertical face 16 of the gun slide 10 and prevents the access of dirt to, and loss of grease from, the bearing.

An inner ring or raceway 17 is supported on the trunnion 12 by a retaining member 18 which is drawn up on the trunnion and held in place by studs or bolts 19. The retaining member 18 is made in the shape of a cap and its exterior cylindrical surface is tapered, this taper increasing in diameter in a direction running from the inner end of the trunnion toward the outer end. The inner surface of the ring or raceway 17 is also tapered so as to cooperate with the retaining member 18 while its outer surface is in the form of a straight cylinder. Because of these cooperating tapered surfaces, when the studs 19 are taken up to draw the retaining member 18 on the trunnion, it will wedge tightly against the inner ring 17. The outer ring or raceway 21 is cylindrical in shape and provided with straight sides. This ring fits snugly within the outer bearing seat 13.

A plurality of roller elements 22 of a conventional type rotate between the inner and outer raceways 17 and 21 respectively. These roller elements are kept in place by means of a cage which may comprise two split sections 20 and 23 (shown in detail in Figs. 4 and 5). This roller cage is assembled, together with the roller elements, before being mounted between the raceways 17 and 21, the sections 20 and 23 being held together by means of rivets 24.

A cover plate 25 covers the entire bearing assembly protecting it from dirt and grit and retaining grease within the bearing. This cover plate may be attached directly to the deck lug but is shown in the preferred embodiment as being bolted to the outer bearing seat 13, by means of studs 30. This cover plate is provided on its inner side with two concentric circular ribs 26 and 27. The purpose of the rib 26 is to provide a narrow surface which, together with the abutment 28 in the outer bearing seat 13, limits the lateral movement of the outer ring 21. Lateral movement of the roller cage is limited on one side by the face 16 of the gun slide and on the other by the rib 27 on the cover plate 25. Ribs 29 and 31 are provided on the outer section 20 and the inner section 23, respectively, of the roller cage. A slight clearance is provided between the rib 26 and the outer ring 21 and between the rib 27 and the roller cage to reduce possible friction to a minimum. A grease hole provided with a threaded plug 32 is drilled in the top of the cover plate 25.

A thrust or wear plate 33 is bolted or otherwise attached to the inner face of the deck lug 11 and against this plate the face 16 of the gun slide bears. Suitable lubrication is provided here by the grease grooves 34 which are supplied with grease through the fittings 35 and the holes 36 drilled through the outer bearing plate 13, the deck lug 11, and the thrust plate 33.

In assembling the gun in its mount, the gun and slide are first lowered into position from above so that the trunnion 12 drops into the opening cut in the deck lug 11. Then the outer bearing seat 13, with washer 15 in position, is inserted in the deck lug and the cap 37, which bridges the opening in the deck lug above the trunnion, is then bolted in place or otherwise attached. The outer ring 21 is usually assembled within the outer bearing seat 13 before mounting in the deck lug but it may be put in place at this point if not previously assembled. Following this, the assembled roller cage and roller elements are placed within the outer ring, after which the inner ring 17 is placed in position. After checking the placement of the trunnion for concentricity with the bearing, the retaining means 18 is put on the end of the trunnion and drawn up gradually by the studs 19. After the weight of the gun has been shifted to the bearing and the retainer has been fully drawn up, the cover plate 25 may then be put in place.

For the purpose of removing the cover plate 25 a number of threaded holes 37 are provided around the edge of the cover plate into which jack screws 38 may be fitted. Threaded holes 39 are also provided in the retainer 18 for the jack screws 41 which are provided to enable removal of the retaining means. Similarly, in the outer bearing seat 13, threaded holes 42 are provided into which jack screws 43 are placed when it is desired to remove this member.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claim all such changes and modifications.

The invention herein described may be manufactured and used by or for the Government of the United States of America for governmental purposes without the payment of any royalties thereon or therefor.

What is claimed as new and desired to be secured by Letters Patent of the United States is:

An anti-friction trunnion bearing for ordnance mounts of heavy caliber, which comprises a support, an outer bearing seat mounted in said support and removable therefrom, releasable means for securing said seat to the support, an outer raceway mounted in said bearing seat, a removable inner raceway tapered on its inner periphery, a plurality of roller elements engaging said raceways, a cage for the roller elements, an annular retainer means removably secured to the trunnion for supporting the inner raceway against excessive lateral displacement, said annular retainer means having a tapered surface on its outer periphery for engagement with the tapered surface of said inner raceway to cause a wedging engagement therebetween, a cover plate having inner annular surfaces bearing against said outer raceway and the cage for preventing excessive lateral movement of said cage and said outer raceway, and releasable means independent of said first releasable means for securing the cover plate to said outer bearing seat.

GEORGE A. CHADWICK.
PHILIAS H. GIROUARD.